Figure 1:
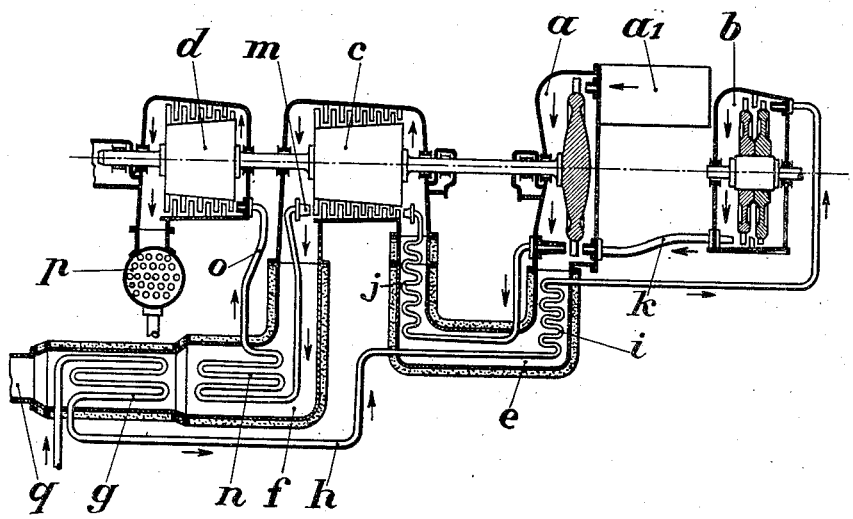

Oct. 10, 1933.  H. HOLZWARTH  1,929,428
EXPLOSION TURBINE PLANT
Filed Nov. 13, 1928    2 Sheets-Sheet 2

Inventor:
HANS HOLZWARTH
By
Attorneys

Patented Oct. 10, 1933

1,929,428

UNITED STATES PATENT OFFICE 1,929,428

EXPLOSION TURBINE PLANT

Hans Holzwarth, Dusseldorf, Germany, assignor to Holzwarth Gas Turbine Co., San Francisco, Calif., a corporation of Delaware Application November 13, 1928, Serial No. 319,050, and in Germany November 17, 1927

12 Claims. (Cl. 60—49)

My invention relates to a method of operating compound gas and steam turbines and more particularly to a turbine plant having a plurality of turbine stages operated by explosion gases generated in one or more constant volume explosion or combustion chambers forming part of the turbine plant and also by steam generated and superheated by the heat of such explosion gases.

It has already been proposed to reduce or to eliminate the injurious effects of the high thermal stresses which occur in the operation of constant volume explosion turbines when the blades of the turbine rotor are struck by the combustion gases issuing from the combustion chambers, by cooling the blades with a current of steam; if possible, with the simultaneous performance of work by such steam in the turbine. By means of this highly advantageous method of cooling, the efficiency of the whole plant is considerably increased because of the fact that the heat required for generating the cooling and working steam is derived from the waste heat (i. e. heat which cannot be directly converted into mechanical energy in the turbine plant, such as the heat contained in the completely exhausted gases and the heat lost through the explosion chamber walls) or residual heat (i. e. the heat contained in partially exhausted gases capable of doing further mechanical work) of the explosion turbine itself.

The present invention rests upon the discovery of the fact that the highest possible efficiency has not yet been reached with the process above described, and that the efficiency of the plant can be still further and surprisingly increased in accordance with the present invention by superheating the steam generated by the method above mentioned by means of the residual heat of a still higher stage of the compound turbine. The slight amount of heat which, according to the known process, is transferred to the saturated cooling and working steam during the cooling of the blades could be taken up only as superheating heat, so that in order to effect a considerable reduction of the combustion gas temperature, in addition to an efficient cooling of the blades, it was necessary, because of the limited heat absorbing capacity of a unit weight of steam, to conduct a very considerable quantity of steam to the turbine. A simple calculation shows, however, that the amount of heat required for the production of the necessary large amount of steam is of about the same magnitude as the quantity of heat which is liberated in the generation of the combustion gases in the explosion chambers of the turbine; this quantity of heat cannot therefore be obtained from the residual heat of the explosion turbine. If, however, a separate steam generator were combined with the turbine plant in order to produce the necessary large amount of steam, the organic make-up of the power plant would be disturbed and the total efficiency would, as a result of the addition of this generator which operates at lower efficiency, be appreciably reduced. On the other hand, an effective reduction of the combustion gas temperature cannot be dispensed with, if it becomes necessary for the sake of the greatest possible turbine efficiency to increase the operating pressure or, in other words, the energy drop, and to utilize the energy of the gases in two or more stages as in a compound turbine. Heretofore in explosion turbines of the constant volume type, the total combustion gas pressure drop was effected in a single stage whose rotor was composed of a plurality of sets of blades. By increasing the pressure drop and simultaneously dividing the same among a number of stages, the temperature of the combustion gas stream is increased as it leaves the nozzle of the high pressure stage because such nozzle therefore utilizes a smaller pressure drop than in prior constructions, so that with the same initial gas temperatures the nozzle exit temperature will be higher than was formerly the case. In this connection it is pointed out that by the increase of the charging pressure, and thus of the explosion pressure, the maximum explosion temperature is not affected when fuel-air mixtures of constant heat content are employed. It is rather important to mention this fact at this point because the conditions under discussion are fundamentally different in the case of explosion turbines from the corresponding conditions which exist in piston combustion engines in which the compression takes place in the working cylinder itself, as a result of which an increase in the temperature is organically linked up with an increase in the pre-ignition pressure.

The first stage, i. e. the so-called high pressure stage, of the compound turbine, therefore requires, as a result of the higher gas temperatures prevailing at the explosion turbine rotor as compared with known explosion turbines, special processes and measures for the safe operative control of the same which form the basis of the present invention. Aside from this, the safe operative control of the lower pressure gas turbines, preferably turbines of the continuous current type, requires processes and measures of a similar nature which are likewise an object of the invention. The fundamental solution of the problem thus outlined has resulted in the above-mentioned invention, in which by superheating of steam by means of the residual heat of a higher stage of the gas turbine the combustion gas temperature is reduced, the combustion gases being thereby made utilizable for the following stage, and in which the energy withdrawn from the gases is taken up by the steam without considerable loss. The capacity of the steam for taking up heat energy, resulting from the application of my invention, will be illustrated by the following example.

After saturated steam, which was generated in the above mentioned way from the waste heat of the gases exhausting from the lowest possible stage of the gas section of the compound turbine, has been superheated in a first gas cooling system associated with a higher stage of the gas turbine section, it is conducted as working steam to the high pressure stage of the steam turbine section of the plant; this turbine may be constructed in known manner as a self-acting unit in a single or multiple housing. This high pressure stage of the steam turbine section may comprise either a steam turbine or the steam section of a gas-steam turbine. Assuming now that the steam is first fed to a single fluid, i. e., steam, turbine, then after the steam has performed work in such turbine, which represents the high pressure stage of the steam turbine section, and has expanded to, say, 1 atmosphere, and has cooled to about 150° C., it may be conducted, before it enters the low pressure stage of the steam turbine section of the plant, to a second cooling system which is likewise located in heat-exchange relationship to the exhaust gases of a higher stage of the gas turbine section, which cooling system serves on the one hand to cool these gases, and on the other to superheat the steam from about 150° to, say, about 350° C. The steam is then conducted at this temperature to the low pressure stage of the steam section of the compound turbine plant. The expanded steam issuing from the first steam turbine, may also be conducted to the steam section of a gas-steam turbine, wherein it is superheated with simultaneous cooling of the turbine blades, after which the steam may be further superheated by the gases exhausting from such gas-steam turbine and then conducted to a condensing steam turbine.

The cooling steam thus takes up, when it enters in the dry saturated state from the waste heat boiler into the previously mentioned first gas cooling system at, say, 20 atmospheres, and is superheated to 450° C. in said cooling system, about 135 k.cal./kg. of superheat in said system. As it leaves the high pressure stage of the steam turbine section of the plant and passes through the second cooling system to the low pressure stage of the turbine, the steam takes up a second quantity of superheat from about 150° to 350° C., which amounts to about 95 k.cal./kg. By this second superheating, the heat absorption capacity of 1 kg. of steam is increased in the ratio of (135+95):135=1.70: 1.00 i. e. it has been increased by 70%. As a result of this increased heat absorbing capacity of the steam there is effected such a reduction of the combustion gas temperature as is necessary to make the control and regulation of explosion compound turbines operatively safe and to operate at those pressures and pressure drops which are conducive to higher economy than has hitherto been attainable in practice with single stage explosion turbines. The increase in efficiency is not, however, to be ascribed only to the increase of the operating pressure and of the pressure drop, but also and above all to the fact that the combustion gas turbines positioned to the rear of the true explosion turbine and operated by the exhaust gases of the latter, particularly where such combustion gas turbines are constructed as continuous current turbines, attain a very high turbine efficiency. The safe industrial control of this intermediate or low pressure combustion gas turbine, which is preferably of the multi-stage type, rests, however, upon the indispensable condition that the combustion gas temperatures are reduced in the manner forming the subject-matter of my invention.

It will be clear that aside from the advantages which are peculiar to my invention as applied to a compound combustion turbine plant, those specific advantages are present which flow from the use of superheated steam in steam turbines as such; namely, favorable influence on the steam requirement and thus increase in the economy also of the steam section, reduced mechanical wear and tear of the blades caused by drops of water, and the smaller steam friction of the turbine discs and the fixed and movable series of blades between each other.

In the above-mentioned numerical example there has already been mentioned a turbine plant which utilizes the residual heat in a number of stages and the advantage of the invention was set forth in the example relating to the superheating of steam by means of the residual heat from a number of gas turbine stages. In this arrangement, which was selected to serve as an example, the steam which was superheated for the first time was conducted first to the high pressure stage of the steam section of the compound turbine to be there expanded and cooled, and if desired could be used over again and may, for example, be employed in this condition for cooling the blades of a pure combustion gas turbine or of a combined combustion gas-steam turbine, or else, after first being superheated, perform work in a stage of the steam turbine section following the high pressure steam stage. If no high pressure steam stage is present in the compound turbine plant then there results, in a further application of my invention, a further increase of heat absorption—that is of the capacity of the steam to serve as a cooling agent—if such steam is generated as wet steam having preferably 10% to 40% of moisture. This advantage operates in favor of compound turbine plants only when one or more stages of the steam turbine section of the compound turbine is first operated with the so generated wet steam; the specific advantages resulting from the use of superheated steam in steam turbines are in such case abandoned for the stage or stages in question. However, it becomes particularly advantageous by reason of the incorporation of this latter advantage into the total process, if the wet steam, before being superheated, is conducted through a stage, preferably the highest pressure or explosion stage, of the combustion gas turbine section of the compound turbine, and in this way the indirect utilization of the capacity of the wet steam for cooling and for performing work in the steam turbine section of the compound turbine, at least at first, is abandoned. It will be obvious that it is within the scope of the invention to conduct the wet steam, after its passage through a stage of bine, such as the heat contained in the completely exhausted gases, I supply the heat energy for preheating and evaporating the water without impairing the working capacity of the explosion gases. The steam so produced is conducted through conduit or pipe h to the cooling system i arranged in collector e directly in the path of the combustion gases to the rear of the high pressure gas turbine a, the steam being in this manner superheated. The heat so abstracted from the explosion gases serves to increase the working capacity of the steam, and is not entirely lost as would be the case if such heat were utilized to generate steam. The superheated steam then performs work in the high pressure steam turbine unit b of the compound turbine plant. After the steam has expanded and cooled in the turbine b it is conducted through conduit k to the steam nozzles of the high pressure gas turbine a to cool the blades thereof and to perform work therein. After a first absorption of heat while cooling the turbine blades of the high pressure gas turbine and passing therethrough, the steam is subjected to a second absorption of heat, which effects an intermediate superheating, in the third cooling system j which is located in collector e in the path of the exhaust gases to the rear of the cooling system i. The steam is then conducted in superheated condition to the steam nozzles of the intermediate pressure combined gas-steam turbines c where it again serves as both a cooling and a working medium. After passing through the unit c the steam collected by the catch nozzles m is conducted to the fourth cooling system m arranged in the collector f and located in the path of the exhaust gases in advance of the steam generator g, in which cooling system or superheater n the steam undergoes a second intermediate superheating. The superheated steam then passes through conduit o to the low pressure steam turbine d where it operates as the working medium and finally is condensed in the condenser p.

Figure 2:
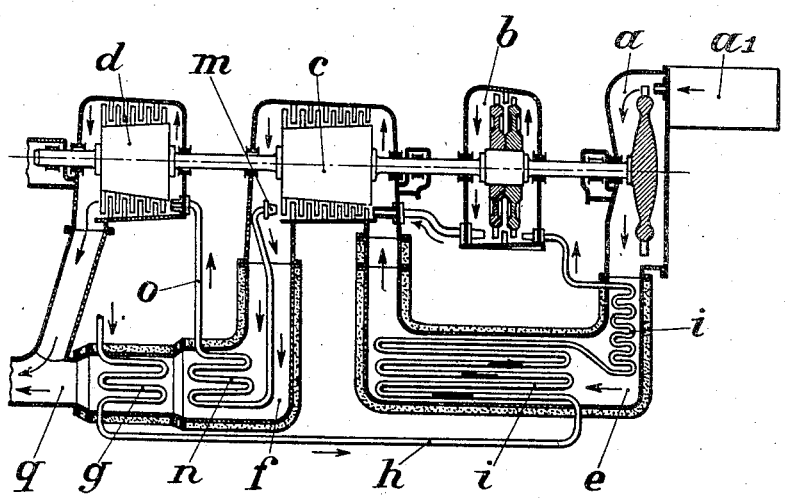

Fig. 2 illustrates the independent turbine arrangement of Fig. 1 with the difference that the high pressure steam turbine b is located between the high pressure gas turbine a and the intermediate combined gas-steam turbine c and cooling of the blades of the high pressure section of the gas turbine is dispensed with; on the other hand, the blades of the intermediate pressure turbine c are cooled directly by the steam exhausting from the high pressure steam turbine b. The steam leaving the intermediate pressure turbine is, however, subjected to an intermediate superheating in the cooling system or superheater n before entering the low pressure steam turbine unit d of the compound turbine. The steam is initially superheated in the coils i to such an extent that condensation does not take place in any of the turbines b, c and d (or turbines c and d if no turbine b is used). The low pressure turbine d operates as an exhaust turbine and discharges the exhaust steam into the collecting or exhaust tube q for the completely cooled and deenergized combustion gases.

Figure 3:
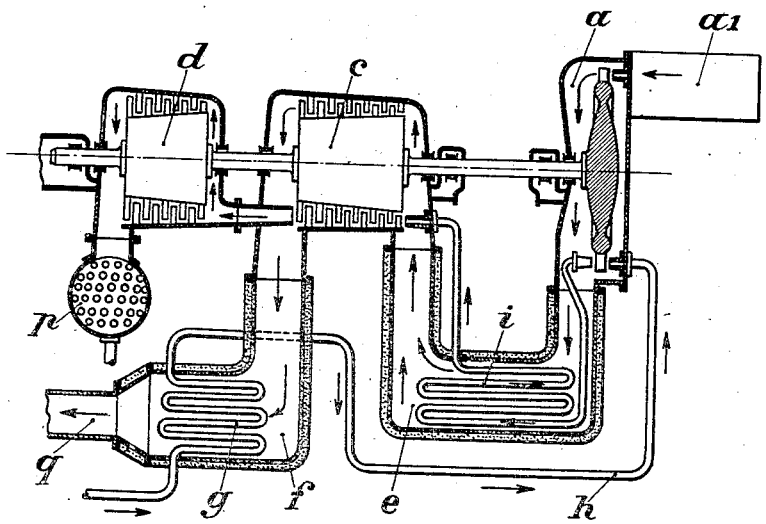

In Fig. 3, there is shown an arrangement which includes a high pressure gas turbine a, an intermediate pressure combined gas-steam turbine c and a low pressure steam turbine d. No independent high pressure steam turbine unit is included in this system. As a result, there is no necessity for drying or even superheating the steam generated in coil g, which steam has a moisture content of 10% to 40%; the wet steam is, on the contrary, discharged directly against the blades of the high pressure gas turbine unit a. In addition to the heat absorption effected in the latter, the steam is subjected to superheating in the cooling system or superheater i which, as in the arrangements above described, is located directly in the path of the combustion gases to the rear of the high pressure gas turbine, and is conducted in superheated condition to the steam nozzles of the intermediate pressure turbine c. While according to Fig. 3 the steam is charged directly after leaving the intermediate pressure turbine into the low pressure steam turbine d, in the turbine plant illustrated in Fig. 4, which in other respects resembles Fig. 3, the steam is superheated in cooling system n before being charged into the low pressure steam turbine d.

It will be seen from the drawings that all the turbines may be intercoupled so as to drive a common shaft.

Variations from the forms illustrated may be resorted to within the scope of the appended claims without departing from the spirit of the invention.

I claim:

1. A turbine plant comprising an explosion gas turbine, a conduit for charging explosion gases to said turbine, a combined gas-steam turbine operable by separate currents of gas and steam, a conduit for conducting the exhaust gases from the first to the second-mentioned turbine, a steam generator located in the path of the gases exhausting from said gas-steam turbine for producing steam with the residual heat of said gases, a superheater arranged to be heated by the residual heat of said explosion gas turbine, a conduit connecting said steam generator with said superheater to conduct to the latter the steam generated in said generator with the heat of the completely exhausted gases, and a conduit for conducting the steam in superheated condition to the steam section of the gas-steam turbine.

2. A turbine plant comprising an explosion gas turbine, a conduit for charging explosion gases to said turbine, a combined gas-steam turbine operable by separate currents of gas and steam, a conduit for conducting the exhaust gases from the first to the second-mentioned turbine, a steam generator arranged to be heated by the residual heat of the completely exhausted gases, a superheater for said steam arranged to be heated by the residual heat of the explosion gas turbine, a conduit connecting said steam generator with said superheater to conduct to the latter the steam generated in said generator with the heat of the completely exhausted gases, a conduit for conducting the steam in superheated condition to the steam section of the gas-steam turbine, a steam turbine and a conduit for leading the steam exhausting from the gas-steam turbine to the steam turbine.

3. A turbine plant comprising an explosion gas turbine, a conduit for charging explosion gases to said turbine, a combined gas-steam turbine operable by separate currents of gas and steam, a conduit for conducting the exhaust gases from the first to the second-mentioned turbine, a steam generator arranged to be heated by the residual heat of the completely exhausted gases, a superheater for said steam arranged to be heated by the residual heat of the explosion gas turbine, a conduit connecting said steam generator with said superheater to conduct to the latter the steam generated in said generator with the heat of the completely exhausted gases, a conduit for the combustion gas turbine section of the compound turbine and after intermediate superheating, into the steam turbine section.

The following will illustrate the advantages flowing from the generation of the steam as wet steam, which must be used if the very high gas temperatures cannot be sufficiently reduced in spite of repeated superheating and intermediate superheating of the steam and in spite of increase of the steam pressure. If the wet steam on its entry into the first stage of the combustion gas turbine or into the first cooling system has $y$ parts by weight of moisture for each unit by weight of steam, it can take up, before it becomes dry and saturated, $y \cdot r$ k.cal./kg. of heat, where $r$ represents the heat of vaporization. At pressures between 15 and 40 atmospheres the heat of vaporization is between 450 and 410 k.cal./kg. With a moisture content of 1% ($y=0.01$), there can thus be absorbed by 1 kg. of steam 4.5 to 4.1 k.cal.; with 10% moisture content, 45 to 41 k.cal./kg., and with 35% moisture content 157 to 144 k.cal./kg. can be absorbed. The heat absorption capacity resulting from the drying of the steam with these degrees of moisture content thus approaches the magnitude of heat absorption capacity resulting from superheating. There can therefore be absorbed by 1 kg. of steam at 20 atmospheres and with 35% original moisture content: $157+135+95=387$ k.cal./kg. The combustion gases which exhaust at, for example, 900° C. from the high pressure combustion gas turbine stage into the first cooling system to be there reduced to, say, 500° C. by the cooling steam, must, to this end, be deprived of about $(900-500) \cdot 0.3 = 120$ k.cal./kg. There are originally present in the combustion gases about 400 k.cal./kg. of combustion heat which is liberated in the combustion chambers. Of this heat about 40% is available for the generation of steam as waste heat in the exhausting gases of an intermediate pressure combustion gas turbine following the high pressure gas turbine; thus each kilogram of combustion gas supplies about $0.4 \cdot 400 = 160$ k.cal. The heat required for the generation of 1 kg. of wet steam of, say, 20 atmospheres with $y$ parts by weight of moisture, amounts to $215.9 + (1-y) \cdot 450.3 = 666.2 - 450.3y$; thus if $y=0.35$, about 508 k.cal./kg. are required if feed water of 0° C. is employed; if feed water of a temperature of 15° C. is used, the amount of heat required will be $508-15=493$ k.cal./kg. It is therefore possible to produce with the residual heat of 1 kg. of combustion gas $$\frac{160}{493} = 0.324 \text{ kg.}$$

of wet steam at 20 atmospheres and 35% moisture content. This steam can absorb $0.324 \cdot 387 = 125.5$ k.cal. of heat, which is sufficient to cover the amount (120 k.cal./kg.) which must be abstracted from the combustion gases.

If the compound gas and steam turbine plant includes a high pressure steam turbine unit, the process is preferably so carried out that the superheated steam is conducted, after first passing through the high pressure steam turbine stages, to an intermediate pressure combined gas-steam turbine together with the exhaust gases of a high pressure gas turbine. In this way the result is attained that the steam which has been expanded and cooled in the high pressure steam stage possesses, on the one hand, still sufficiently high pressure and temperature to attain a favorable working efficiency in an intermediate pressure turbine designed for steam in such condition, and on the other hand, has a sufficiently low temperature to effect a desirable cooling of the blades of such intermediate pressure gas turbine. If, however, it is desired to conduct the steam, after it has performed work in a high pressure steam turbine, not to an intermediate pressure gas turbine but directly to the high pressure gas turbine both for cooling and performing work therein, then the temperatures existing in the latter are sufficiently above the temperature of the expanded and cooled steam so that in spite of repeated superheating of the latter before its entry into the high pressure stage of the gas turbine section, a temperature difference remains which is sufficient to effect proper cooling, and the specific advantages of superheated steam, when it is employed for performing mechanical work in the high pressure gas turbine, favorably affect the economy of the total process.

Figure 4:
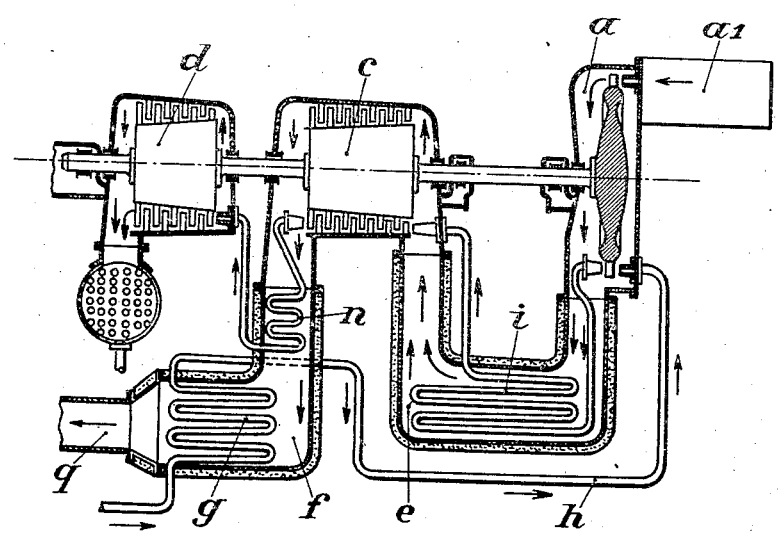

Apparatus for carrying out the process forming the subject-matter of my invention may take numerous forms and embodiments. Several plants which may serve for carrying out the above described process are shown in the accompanying drawings, but it will be understood that they are shown by way of example only and in no wise define the limits of my invention. In said drawings, Fig. 1 is a diagrammatic view in elevation showing a turbine plant including a high pressure steam turbine and embodying the principles of my invention; Fig. 2 is a modification thereof; and Figs. 3 and 4 are still further modifications, showing turbine plants wherein the high pressure steam turbine shown in Figs. 1 and 2, is dispensed with.

Fig. 1 shows a compound gas and steam turbine plant having an independent high pressure gas turbine unit $a$, an independent high pressure steam turbine unit $b$, an independent intermediate pressure combined gas-steam turbine unit $c$ and an independent low pressure steam turbine unit $d$. The path of the combustion gases leads from the constant volume combustion chamber $a_1$, wherein they are generated, to the high pressure gas turbine $a$ where they impinge against the blades of the rotor of such turbine. The gases are then collected in a collector $e$ from which they are conducted to the intermediate pressure gas-steam turbine $c$ whose gas section is preferably in the form of a continuous current gas turbine. It will be understood that a plurality of combustion or explosion chambers $a_1$ may be arranged to discharge gases against the rotor of the high pressure gas turbine $a$, as shown in my United States Patent No. 877,194. Corresponding to the construction of turbine $c$ as a continuous current gas turbine, the collector $e$ serves, in addition to containing the cooling systems described hereinbelow, as a pressure equalizer for the combustion gases and thus operates as a gas storing device. After the combustion gases have impinged against the blades of the intermediate pressure turbine $c$ they pass through collector $f$ into the atmosphere.

The collectors $e$ and $f$ contain four cooling systems. The collector $f$ contains, first, a cooling coil $g$ for the production of steam from the waste heat, or the heat of the exhaust gases, of the last stage $c$ of the gas turbine section of the compound turbine. The steam generator $g$ is arranged at the discharging end of the collector $f$, as the combustion gas temperatures at this point are still sufficiently high to generate steam. By generating steam with the waste heat of the turconducting the steam in superheated condition to the steam section of the gas-steam turbine, a second superheater located in heat-exchange relation to the gases exhausting from the gas-steam turbine for superheating the exhaust steam of the latter, a conduit for conducting such exhaust steam from the gas-steam turbine to said second superheater, a steam turbine, and a conduit for leading the superheated exhaust steam to said steam turbine.

4. A turbine plant comprising a steam turbine, an explosion gas turbine, a combined explosion gas-steam turbine, a conduit for conducting explosion gases to said gas turbine, a conduit for leading the exhaust gases of the latter to the gas section of the gas-steam turbine, a steam generator located in the path of the gases exhausting from said gas-steam turbine, a superheater heated by the residual heat of the explosion gas turbine for superheating the steam so generated, a steam line for conducting the superheated steam to said steam turbine, and a conduit for leading the exhaust steam of the latter to the steam section of the gas-steam turbine.

5. A turbine plant comprising a steam turbine, an explosion gas turbine, a combined explosion gas-steam turbine, a conduit for conducting explosion gases to said gas turbine, a conduit for leading the exhaust gases of the latter to the gas section of the gas-steam turbine, a steam generator located in the path of the gases exhausting from said gas-steam turbine, a superheater heated by the residual heat of the explosion gas turbine for superheating the steam so generated, a steam line for conducting the superheated steam to said steam turbine, a conduit for leading the exhaust steam of the latter to the steam section of the gas-steam turbine, a second steam turbine, and a conduit for conveying the exhaust steam of the gas-steam turbine to said second steam turbine.

6. The combination set forth in claim 5 including a superheater heated by the exhaust gases of the gas-steam turbine for superheating the exhaust steam of the latter turbine prior to its entry into the second steam turbine.

7. A turbine plant as set forth in claim 1 wherein said gas turbine and gas-steam turbine are intercoupled to drive a common shaft.

8. A turbine plant as set forth in claim 4 wherein said gas turbine, steam turbine, and gas-steam turbine are intercoupled to drive a common shaft.

9. A turbine plant as set forth in claim 5 wherein said gas turbine, both said steam turbines and said gas-steam turbine are intercoupled to drive a common shaft.

10. A turbine plant as set forth in claim 1, wherein the conduit connecting the steam generator with the superheater leads first to the explosion gas turbine to direct the generated steam against the blades of such turbine, the steam exhausting from the latter being caught and conveyed by said conduit to the superheater.

11. A turbine plant as set forth in claim 1, including a steam turbine, the conduit connecting the steam generator with the superheater leading first to said steam turbine, from the steam turbine to the explosion gas turbine, and from the latter to the superheater.

12. A turbine plant as set forth in claim 1, including a steam turbine, the conduit connecting the steam generator with the superheater leading first to said steam turbine, the steam exhausting from the latter being caught and conveyed by said conduit to the superheater.

HANS HOLZWARTH.